United States Patent
Ma et al.

(10) Patent No.: US 11,222,398 B2
(45) Date of Patent: Jan. 11, 2022

(54) MULTIPLE THUMBNAILS FOR ATTACHMENTS IN ELECTRONIC COMMUNICATIONS

(71) Applicant: Microsoft Technology Licensing, LLC, Redmond, WA (US)

(72) Inventors: Jin Ma, Redmond, WA (US); Jun Chen, Redmond, WA (US); Elena Catrinescu, Woodinville, WA (US); Mirela Dal Col Silva Correa, Kirkland, WA (US); Nathan F. Waddoups, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 142 days.

(21) Appl. No.: 15/688,499

(22) Filed: Aug. 28, 2017

(65) Prior Publication Data
US 2019/0066261 A1    Feb. 28, 2019

(51) Int. Cl.
    G06T 3/40      (2006.01)
    H04L 12/58     (2006.01)
    G06Q 10/10     (2012.01)

(52) U.S. Cl.
    CPC ............. G06T 3/40 (2013.01); G06Q 10/107 (2013.01); H04L 51/08 (2013.01); *H04L 51/04* (2013.01)

(58) Field of Classification Search
    CPC ......... G06T 3/4092; G06T 3/40; H04L 51/08; H04L 51/18; H04L 51/34; H04L 51/04
    See application file for complete search history.

(56) References Cited

U.S. PATENT DOCUMENTS 6,138,156 A * 10/2000 Fletcher ............... H04L 12/14
                                                        709/217
6,310,601 B1* 10/2001 Moore .................... G06F 3/14
                                                        345/660

(Continued)

FOREIGN PATENT DOCUMENTS

WO    2015049595 A1    4/2015
WO    2016209967 A1   12/2016

OTHER PUBLICATIONS

"Adjusting Worker Threads to Improve Thumbnail Generation Performance", Retreived from: https://www.ibm.com/support/knowledgecenter/en/SSNW2F_5.2.0/com.ibm.p8.performance.doc/p8ppt320.htm, Oct. 2013, 1 Page.

(Continued)

*Primary Examiner* — Kavita Stanley
*Assistant Examiner* — Tyler Schallhorn
(74) *Attorney, Agent, or Firm* — Liang IP, PLLC

(57) ABSTRACT

Described herein are systems and methods for transporting an electronic communication that includes one or more attachments efficiently by sending the electronic communication with a smaller-sized (e.g., lower resolution) representational element of each attachment and subsequently replacing each representational element with a higher resolution attachment thumbnail of the attachment. The high resolution attachment thumbnail is produced in an asynchronous process during or after the transportation of the attachment(s) and the electronic communication. After the high resolution attachment thumbnail(s) is generated, at least one representational element in the electronic communication may be replaced with a corresponding HR attachment thumbnail.

20 Claims, 9 Drawing Sheets

(56) References Cited

U.S. PATENT DOCUMENTS

| | | | | |
|---|---|---|---|---|
| 7,409,425 B2* | 8/2008 | Naick | H04L 51/063 | 709/203 |
| 7,451,405 B2* | 11/2008 | Sylthe | G06T 3/4092 | 715/798 |
| 7,478,132 B2* | 1/2009 | Chen | G06Q 10/107 | 709/206 |
| 7,483,948 B2* | 1/2009 | Auhagen | G06Q 10/107 | 707/999.104 |
| 7,570,296 B2* | 8/2009 | Sawachi | H04N 1/2112 | 348/231.2 |
| 7,840,642 B2* | 11/2010 | Naick | H04L 51/08 | 709/206 |
| 7,970,834 B2* | 6/2011 | Daniels | H04L 51/34 | 709/206 |
| 8,185,591 B1* | 5/2012 | Lewis | G06Q 10/107 | 358/1.15 |
| 8,196,062 B2* | 6/2012 | Sylthe | G06T 3/4092 | 715/798 |
| 8,584,037 B2* | 11/2013 | Sylthe | G06T 3/4092 | 715/788 |
| 8,719,351 B2* | 5/2014 | Chen | H04L 51/066 | 709/206 |
| 8,892,660 B2* | 11/2014 | Chen | H04L 51/18 | 709/206 |
| 9,076,239 B2 | 7/2015 | Pascali et al. | | |
| 9,204,175 B2 | 12/2015 | Orleth | | |
| 9,477,947 B2* | 10/2016 | Farrell | G06Q 10/00 | |
| 9,514,536 B2 | 12/2016 | Rafati et al. | | |
| 9,602,453 B2* | 3/2017 | Bhatia | H04L 51/08 | |
| 9,608,948 B2* | 3/2017 | Sylthe | H04L 51/08 | |
| 10,064,024 B2* | 8/2018 | Pokharel | H04W 4/12 | |
| 10,122,675 B2* | 11/2018 | Farrell | H04L 51/34 | |
| 10,412,029 B2* | 9/2019 | Friend | G06F 40/205 | |
| 10,447,639 B2* | 10/2019 | Ali | H04L 67/02 | |
| 10,757,059 B2* | 8/2020 | Ali | H04L 51/063 | |
| 2001/0054075 A1* | 12/2001 | Miyanaga | H04L 51/066 | 709/206 |
| 2002/0016818 A1* | 2/2002 | Kirani | G06F 17/30902 | 709/203 |
| 2002/0133543 A1* | 9/2002 | Fujiwara | G06Q 10/107 | 709/203 |
| 2003/0147563 A1* | 8/2003 | Liu | H04N 1/32128 | 382/276 |
| 2004/0021789 A1* | 2/2004 | Sawachi | H04N 1/2112 | 348/333.01 |
| 2004/0165789 A1* | 8/2004 | Ii | H04N 19/176 | 382/299 |
| 2005/0108335 A1* | 5/2005 | Naick | H04L 51/08 | 709/206 |
| 2005/0188026 A1* | 8/2005 | Hilbert | H04L 51/063 | 709/206 |
| 2006/0012833 A1* | 1/2006 | Ito | H04N 1/00209 | 358/400 |
| 2006/0168346 A1* | 7/2006 | Chen | H04L 51/18 | 709/246 |
| 2006/0230114 A1* | 10/2006 | Auhagen | G06Q 10/107 | 709/206 |
| 2007/0035764 A1 | 2/2007 | Aldrich et al. | | |
| 2007/0100991 A1* | 5/2007 | Daniels | H04L 51/34 | 709/224 |
| 2007/0136427 A1* | 6/2007 | Zellner | G06Q 10/107 | 709/206 |
| 2007/0234239 A1* | 10/2007 | Sylthe | G06F 3/1407 | 715/864 |
| 2007/0255792 A1* | 11/2007 | Gronberg | H04L 51/066 | 709/206 |
| 2008/0189379 A1* | 8/2008 | Naick | H04L 51/08 | 709/206 |
| 2008/0196076 A1* | 8/2008 | Shatz | H04N 1/00127 | 725/116 |
| 2008/0316225 A1* | 12/2008 | Sylthe | G06T 3/4092 | 345/620 |
| 2009/0049150 A1* | 2/2009 | Malik | H04L 51/066 | 709/206 |
| 2009/0089389 A1* | 4/2009 | Chen | G06Q 10/107 | 709/206 |
| 2010/0315529 A1* | 12/2010 | Nakase | H04N 1/32128 | 348/222.1 |
| 2011/0047222 A1* | 2/2011 | Farrell | G06Q 10/00 | 709/206 |
| 2011/0066687 A1* | 3/2011 | Chen | H04L 51/066 | 709/206 |
| 2012/0218269 A1* | 8/2012 | Sylthe | G06T 3/4092 | 345/440 |
| 2012/0226760 A1* | 9/2012 | Lewis | H04L 51/08 | 709/206 |
| 2014/0059150 A1* | 2/2014 | Sylthe | G06F 16/957 | 709/206 |
| 2014/0114973 A1* | 4/2014 | Wetherell | G06F 3/04817 | 707/737 |
| 2014/0115483 A1* | 4/2014 | Wetherell | G06F 16/35 | 715/738 |
| 2014/0115495 A1* | 4/2014 | Wetherell | G06Q 10/107 | 715/752 |
| 2015/0200885 A1 | 7/2015 | Sharp et al. | | |
| 2015/0237485 A1* | 8/2015 | Pokharel | H04M 1/72547 | 455/466 |
| 2016/0064039 A1 | 3/2016 | Wu et al. | | |
| 2016/0104052 A1 | 4/2016 | Kim et al. | | |
| 2017/0041281 A1* | 2/2017 | Farrell | G06Q 10/00 | |
| 2017/0099246 A1* | 4/2017 | Ali | H04L 51/063 | |
| 2017/0171122 A1* | 6/2017 | Friend | G06T 3/40 | |
| 2019/0075070 A1* | 3/2019 | Farrell | H04L 51/063 | |
| 2019/0349324 A1* | 11/2019 | Friend | H04L 51/10 | |
| 2019/0394157 A1* | 12/2019 | Ali | H04L 51/36 | |

OTHER PUBLICATIONS

Ertmann, Aske, "RFC: Asynchronous Thumbnail Generation in Media Browser", Retrieved from: https://discuss.neos.io/t/rfc-asynchronous-thumbnail-generation-in-media-browser/587, Oct. 27, 2015, 6 Pages.

"International Search Report and Written Opinion Issued in PCT Application No. PCT/US2018/037670", dated Sep. 21, 2018, 12 Pages.

* cited by examiner

MULTIPLE THUMBNAILS FOR ATTACHMENTS IN ELECTRONIC COMMUNICATIONS

BACKGROUND

Electronic communications applications or services allow users to send and receive electronic communications over local and distributed networks, such as the Internet. One example of an electronic communications application is an electronic mail (email) application. Email applications or services are provided by a software application installed on a user's computer or by cloud or Internet-based services.

Email applications permit users (senders) to send files ("attachments") to a recipient by attaching the files to an email message. When the recipient views the email message, the email application presents the attachments to the recipient in a number of ways. If the attachment is an image file, the email application typically generates a thumbnail image ("thumbnail") of the image file and the recipient sees the thumbnail when he or she views the email message. A thumbnail is a smaller, lower resolution version of the image file that may be generated by sub-sampling the original higher resolution image file.

When the attachment is a non-image file, such as a word processing file, the email application may display an icon that is associated with the file type of the attachment or a low resolution thumbnail of the file. For example, if the attachment is a word processing file, an icon that represents the word processing program can be presented to the recipient. Similarly, if the attachment is a spreadsheet file, an icon that represents the spreadsheet program may be presented to the recipient. However, in some instances, the process of generating the thumbnail is time consuming and can slow the transmission of the email, which in turn delays the arrival of the email.

It is with respect to these and other general considerations that embodiments have been described. Also, although relatively specific problems have been discussed, it should be understood that the embodiments should not be limited to solving the specific problems identified in the background.

SUMMARY

Embodiments disclosed herein transport an electronic communication with a smaller-sized (e.g., lower resolution) representational element of an attachment. A high resolution attachment thumbnail is produced in an asynchronous process during or after the transportation of the attachment(s) and the electronic communication. After the high resolution attachment thumbnail is generated, the representational element in the electronic communication may be replaced with the HR attachment thumbnail. In one example embodiment, the electronic communication is an electronic mail message with one or more files attached to the electronic mail message.

In one aspect, a system includes a communications device, one or more processing units operably connected to the communications device, and one or more storage devices. The one or more storage devices store instructions that when executed by the one or more processing units, cause the one or more processing units to perform a method. The method includes sending, using the communications device, an electronic communication with an attachment and a low resolution (LR) representational element representing the attachment to a computing device, after the electronic communication is sent, generating a high resolution (HR) attachment thumbnail using the attachment, and replacing, or causing to be replaced, the LR representational element with the HR attachment thumbnail. In some embodiments, the LR representational element is replaced with the HR attachment thumbnail when the electronic communication has not been viewed previously by the recipient of the electronic communication.

In another aspect, a method includes sending an electronic communication with an attachment to a computing device, where the attachment is represented by a low resolution (LR) representational element, after the electronic communication is sent, generating a high resolution thumbnail using the attachment, and in response to a determination that the electronic communication has not been viewed previously, causing the representational element to be replaced with the high resolution thumbnail.

In another aspect, a method for providing a high resolution (HR) attachment thumbnail for a transmitted electronic communication that includes an attachment includes opening the attachment and converting at least one page in the attachment to an image file. The HR attachment thumbnail is then generating based on the image file. A representational element in the electronic communication that represents the attachment is replaced (or is caused to be replaced) with the HR attachment thumbnail. In some embodiments, the representational element is replaced with the HR attachment thumbnail when the electronic communication has not been viewed previously by the recipient of the electronic communication.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures. The elements of the drawings are not necessarily to scale relative to each other. Identical reference numerals have been used, where possible, to designate identical features that are common to the figures.

DETAILED DESCRIPTION

Figure 1:
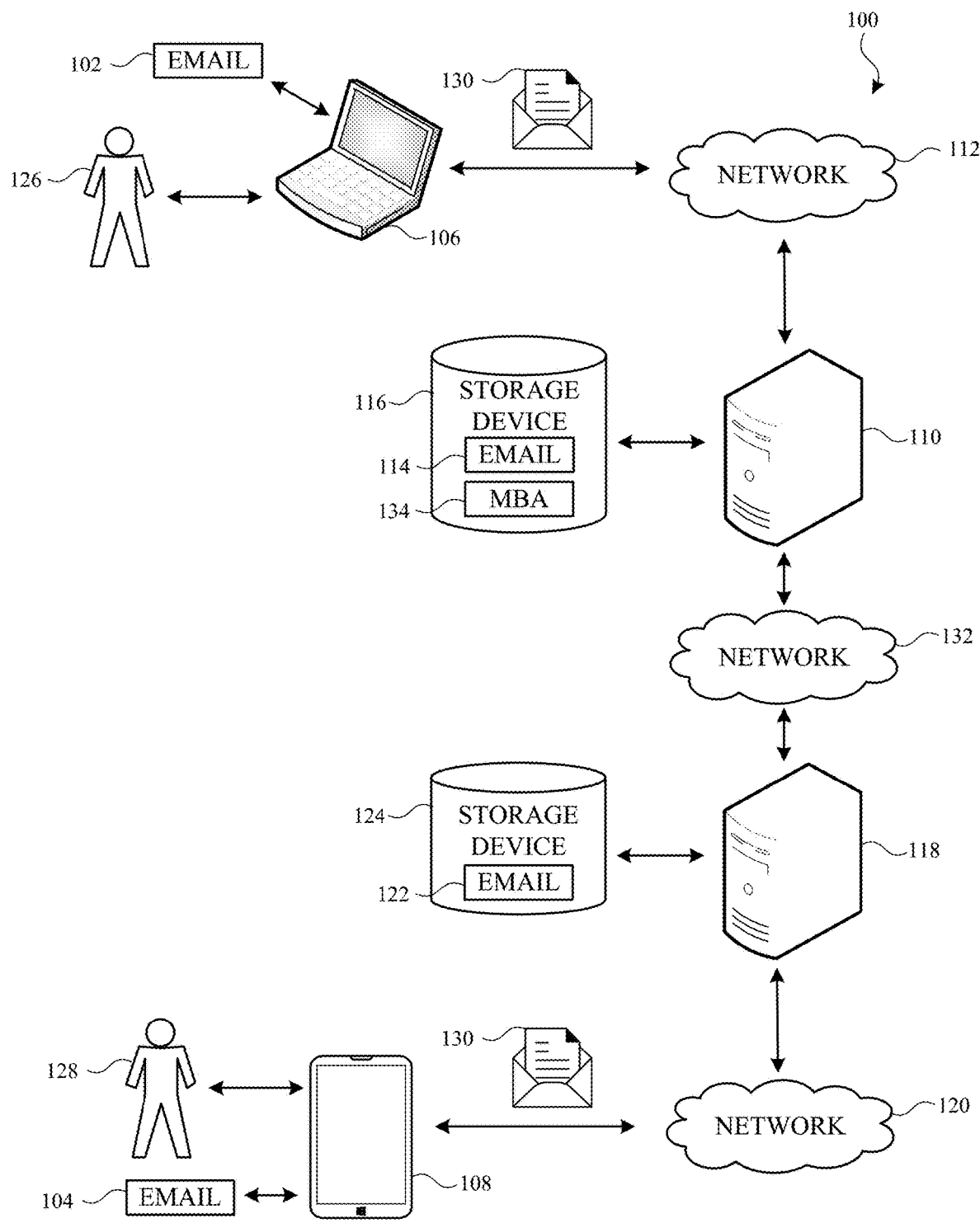
FIG. 1 illustrates an example system that can include an electronic mail application and a mailbox assistant application.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Embodiments described herein provide a process for transporting electronic communications that include one or more attachments efficiently by sending the electronic communications with a smaller-sized (e.g., lower resolution) representational element of an attachment and subsequently replacing the representational element with a higher resolution attachment thumbnail of the attachment. In some embodiments, the representational element is a low resolution thumbnail image of the attachment or an embedded image thumbnail associated with image metadata of an image of the attachment (e.g., one or more pages of the attachment).

The high resolution attachment thumbnail is generated separately from the transportation of the electronic communication. The high resolution attachment thumbnail is produced in an asynchronous process after the attachment(s) and the electronic communication with the lower resolution representational element(s) has been sent to the recipient. If the recipient has not viewed or opened the electronic communication, the representational element(s) is replaced with the corresponding higher resolution attachment thumbnail. This allows the recipient to view a high resolution attachment thumbnail of each attachment when the recipient opens or views the electronic communication.

In some situations, generating a high resolution attachment thumbnail in the transportation process can consume a significant amount of time (e.g., when the attachment is a large file), which delays the arrival of the electronic communication. Additionally or alternatively, some high resolution attachment thumbnails can take a long time to produce due to the file type (e.g., word processing documents, portable document file (PDF)). The separate processes of transporting the electronic communication and generating the high resolution attachment thumbnail reduce or minimize delays in the transportation of the electronic communication. The generation of the high resolution attachment thumbnail does not affect the transportation of the electronic communication. The electronic communication with the representational element can arrive during or prior to the generation of the high resolution attachment thumbnail.

High resolution attachment thumbnails can be generated for an attachment associated with any file type. Example file types include, but are not limited to, an image file (e.g., a photo), a document file (e.g., word processing document, presentation, spreadsheet, drawing), a video file, a program, an audio file, and/or another email. Additionally, in some embodiments, a high resolution attachment thumbnail can be generated in multiple sizes (e.g., small, medium, large).

Embodiments disclosed herein are described in conjunction with an electronic mail (email) application, email messages, and attachments to the email messages. However, embodiments are not limited to this implementation. Aspects of the disclosure can be used with any suitable type of electronic communications application that is operable to attach attachments to the electronic communications (e.g., electronic messages). For example, a texting application or an instant messaging application can practice aspects of the disclosure.

FIG. 1 illustrates an example system that can include an electronic mail application and a mailbox assistant application. The system 100 transmits electronic communications, such as electronic mail (email), between email applications 102, 104 running on client-computing devices 106, 108, respectively. The client-computing device 106 is configured to access one or more server-computing devices (represented by server-computing device 110) through one or more networks (represented by network 112) to interact with an email application 114 stored on one or more storage devices (represented by storage device 116) and executed on the server-computing device 110. Similarly, the client-computing device 108 is configured to access one or more server-computing devices (represented by server-computing device 118) through one or more networks (represented by network 120) to interact with an email application 122 stored on one or more storage devices (represented by storage device 124) and executed on the server-computing device 118.

When the user 126 ("sender") wants to send an email to the user 128 ("recipient"), the sender 126 generates the email on the client-computing device 106 using the email application 102. The email application 102 transmits the email 130 (via the client-computing device 106) to the server-computing device 110 using the network 112. The email application 114 stores a copy of the email 130 on the storage device 116 and transmits the email 130 (via the server-computing device 110) to the server-computing device 118 using the network 132. The email application 122 stores a copy of the email 130 on the storage device 124 and transmits the email 130 (via the server-computing device 118) to the client-computer device 108 using the network 120. The recipient 128 can view the email 130 on the client-computing device 108 using the email application 104.

The sender 126 can attach one or more files ("attachments") to the email 130 before sending the email 130 to the recipient 128. The attachment(s) is stored on the storage devices 116, 124 along with the copies of the email 130 when the email 130 and the attachment(s) are transmitted or transported to the client-computing device 108. The attachment(s) displayed in the email 130 is represented with a representational element of the attachment. For example, each attachment can be a resized version of the attachment, represented with an icon associated with the file type of the attachment, or represented with a low resolution thumbnail of the attachment (referred to herein as a LR attachment thumbnail). The attachment may be associated with any suitable file type, including, but not limited to, an image file (e.g., a photo), a document file (e.g., word processing document, presentation, spreadsheet, drawing), a video file, a program, an audio file, and/or another email. Example file types include, but are not limited to, Microsoft® Office documents (e.g., Word®, Excel®), Adobe® documents (e.g., Photoshop®, Illustrator®, and Acrobat®), and/or image documents such as jpg, gif, and tif documents.

As will be described in more detail later, a mailbox assistant (MBA) application 134 can generate a high resolution thumbnail of each attachment (referred to herein as a HR attachment thumbnail) after the email 130 and each representational element of the attachment has been sent to the recipient 128. The MBA application 134 generates an HR attachment thumbnail in a separate asynchronous process from the email transportation process. In some embodiments, when the recipient 128 has not viewed or opened the email 130, the MBA application 134 replaces (or causes to be replaced) the representational element displayed in the email 130 with a corresponding HR attachment thumbnail. In such embodiments, the recipient 128 the HR attachment thumbnail represents the attachment when the recipient views the email 130.

In some embodiments, the MBA application 134 is a computer-executable program that may be stored in the storage device 116 and executed by the server-computing device 110, although this is not required. An MBA application can be stored in one or more suitable storage devices, including one or more storage devices within, or connected to one or both client-computing devices 106, 108, the storage device 116, and/or the storage device 124. Additionally, the MBA application may be executed by the one or more client-computing devices 106, 108, the server-computing device 110, and/or the server-computing device 118.

In one or more embodiments, each network 112, 120, 132 is illustrative of any suitable type of network, for example, an intranet, and/or a distributed computing network (e.g., the Internet) over which the users 126, 128 may communicate with each other and with other computing systems. Additionally, each client-computing device 106, 108 can be a personal or handheld computing device. For example, the client-computing device 106, 108 may be one of: a mobile telephone; a smart phone; a tablet; a phablet; a smart watch; a wearable computer; a personal computer; a desktop computer; a laptop computer; a gaming device/computer (e.g., Xbox); a television; and the like. This list of example client-computing devices is for example purposes only and should not be considered as limiting. Any suitable client-computing device that provides and/or interacts with one or more email applications and/or the transportation of emails to a computing device (to a server or a client computing device) may utilize aspects of the disclosure.

Embodiments are not limited to two client-computing devices 106, 108, two server-computing devices 110, 118, three networks 112, 120, 132, and two storage devices 116, 124. The system 100 can include any suitable number of server-computing devices, networks, client-computing devices, and/or storage devices. For example, in some embodiments, the system 100 may include only one storage device, server-computing device, and network (e.g., server-computing device 110, network 112, and storage device 116). Both client-computing devices 106, 108 may access the server-computing device 110 through the network 112 to receive and transmit emails.

As should be appreciated, FIG. 1 is described for purposes of illustrating the present methods and systems and is not intended to limit the disclosure to a particular sequence of steps or a particular combination of hardware or software components.

Figure 2:
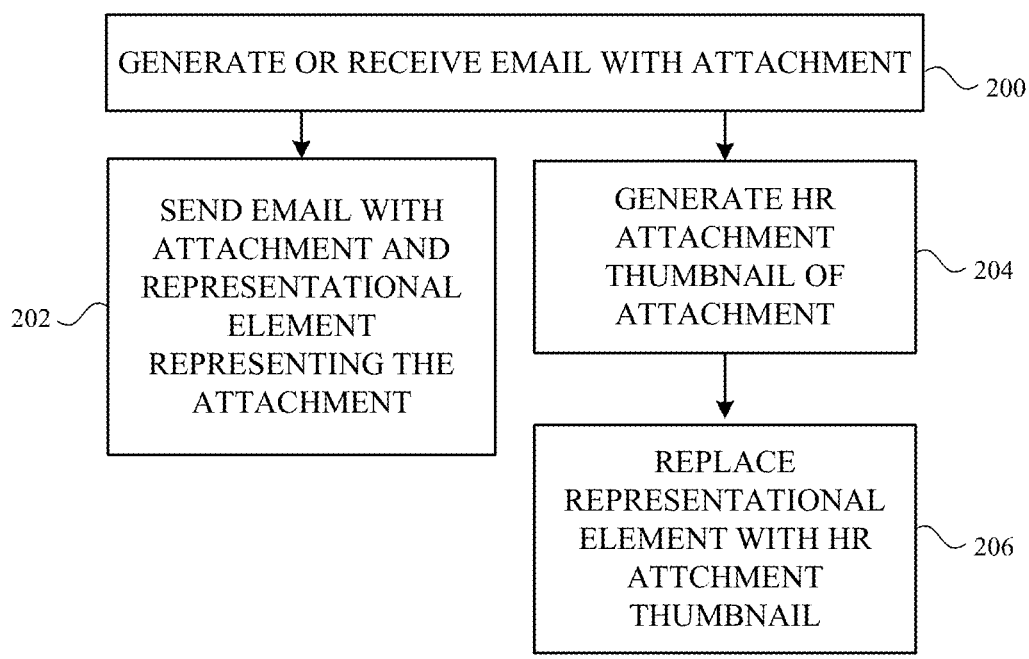
FIG. 2 is a flowchart depicting a method of sending an electronic mail with an attachment.

FIG. 2 is a flowchart depicting a first method of sending an electronic mail with an attachment. The illustrated process may be performed by one or more client-computing devices, server-computing devices, or a combination of client and server computing devices. Initially, an email with an attachment can be generated by a client-computing device or the email and the attachment may be received by a server-computing device or a client-computing device (block 200).

In one embodiment, the attachment is represented in the email with a representational element that is associated with the attachment. For example, the representational element can be an icon or a reduced-size or LR attachment thumbnail. At block 202, the attachment and the email with the representational element are sent to a computing device. The computing device may be a server-computing device or a client-computing device that is accessible by the recipient. The representational element may be generated at the same time as the generation of the email (e.g., when attachment is attached to email), or the representational element can be produced during the transportation of the email and the attachment to the recipient.

An HR attachment thumbnail is then generated in a separate, independent process (block 204). The process of generating the HR attachment thumbnail can operate sequentially or concurrently, or coincide partly in time with the transportation process of the email. After the HR attachment thumbnail is produced at block 204, the representational element representing the attachment is replaced with (or is caused to be replaced with) the HR attachment thumbnail (block 206). In some embodiments, an MBA application (e.g., MBA application 134 in FIG. 1) performs the operations in blocks 204 and 206.

Figure 3:
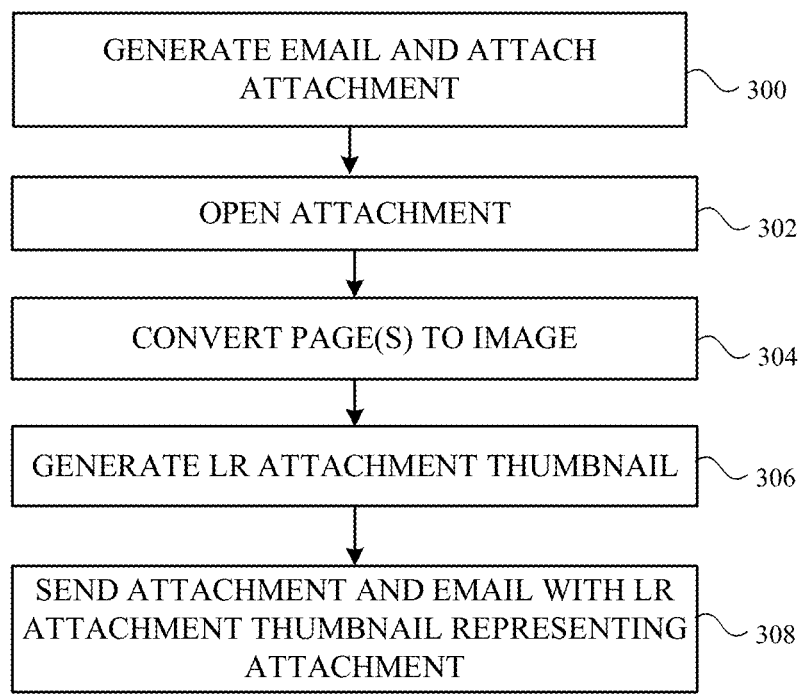
FIG. 3 is a flowchart illustrating a method of providing a low resolution thumbnail of an attachment.

As described earlier, the representational element that represents an attachment when the email is sent may be an icon or a reduced-size or LR attachment thumbnail. FIG. 3 is a flowchart illustrating a first method of providing a low resolution thumbnail of an attachment. The example process may be performed by one or more server-computing devices, one or more client-computing devices, or with a combination of client and server computing devices. In some embodiments, the method is performed by a program (e.g., an email application) that is stored in one or more storage devices and executed by the client-computing device(s) and/or the server-computing device(s) prior to, or during the transportation of the email to the recipient.

Initially, as shown in block 300, an email is generated and an attachment is attached to the email. The attachment is opened and one or more pages in the attachment are converted to an image file. Any suitable technique can be used to convert the page(s) of the attachment to an image file (blocks 302, 304). For example, the at least one page can be converted to an image file by saving the one or more pages as an image file, by printing the page(s) to an image file, or by capturing an image of the page(s) using an image sensor or other suitable imaging device or process (e.g., a screenshot).

Next, as shown in block 306, a LR attachment thumbnail is generated based on the image file. Any suitable technique may be used to generate the LR attachment thumbnail. For example, in one embodiment, the image file generated at block 308 is re-sized to a suitable number of pixels through sub-sampling of the image file. In another example, the image can be cropped to reduce the size of the image file. In some embodiments, the image file produced at block 304 may be used as the LR attachment thumbnail. In yet another example, the image metadata associated with the image file can be obtained and used to generate the LR attachment thumbnail. For example, in some instances, an embedded image thumbnail is associated with the image metadata, and the embedded image thumbnail may be used as the LR attachment thumbnail.

The attachment and the email with the LR attachment thumbnail representing the attachment are then sent to a computing device (block 308). The computing device may be a server-computing device or a client-computing device that is accessible by the recipient.

Although the method shown in FIG. 3 is described with one attachment, multiple attachments can be attached to the email in other embodiments. The operations in blocks 302, 304, and 306 are performed for each attachment. The operations in blocks 302, 304, 306 for the multiple attachments may be performed sequentially, concurrently, or partly coincide in time.

Figure 4:
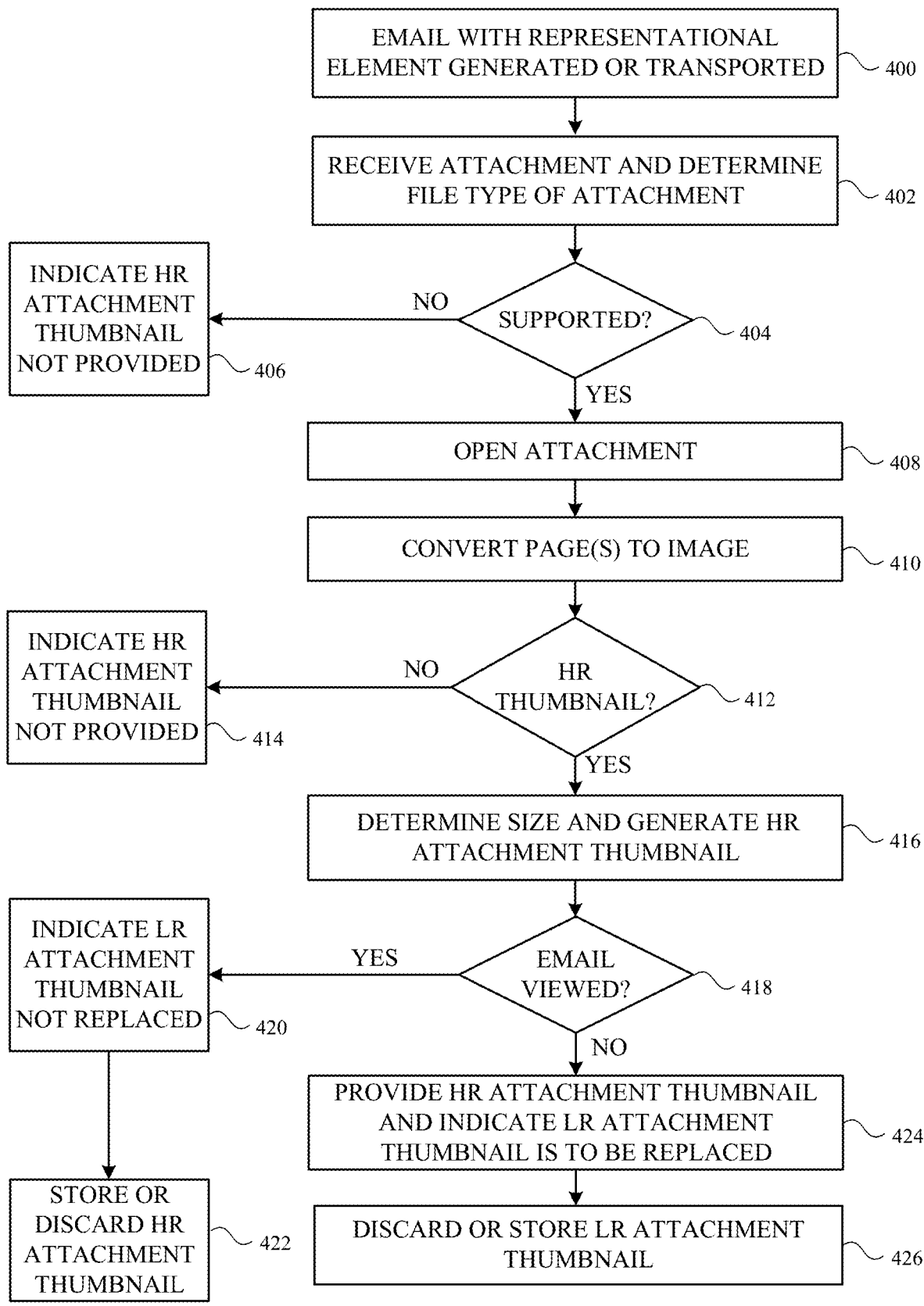
FIG. 4 is a flowchart depicting a method of providing a high resolution thumbnail of an attachment.

FIG. 4 is a flowchart depicting a method of providing a high resolution thumbnail of an attachment. The method is performed independent of the process of transporting an electronic communication (e.g., an email). The illustrated process may be performed by one or more server-computing devices, one or more client-computing devices, or with a combination of client and server computing devices. In some embodiments, the method is performed by an MBA application that is stored in one or more storage devices and executed by the client-computing device(s) and/or the server-computing device(s).

The illustrated process begins after an email with an attachment is generated, transmitted, or received (block 400). At block 402, the attachment is received and a file type associated with the attachment is determined. As described earlier, the attachment can be associated with any suitable file type, including, but not limited to, an image file (e.g., a photo), a document file (e.g., word processing document, presentation, spreadsheet, drawing), a video file, a program, an audio file, and/or another email. The attachment may be received in one of several ways. For example, a copy of email along with the attachment can be received at block 300 or a copy of the attachment (without the email) may be received at block 300.

A determination is then made at block 404 as to whether the determined file type is supported. Generally, a file type is supported when the attachment can be opened and/or an HR attachment thumbnail of the attachment can be generated. If the file type is not supported, the process passes to block 406 where an indication is provided that an HR attachment thumbnail will not be generated or provided. The indication may be a signal or data that is provided to the email application, to an operating system, or to any suitable device or program running on a client-computing device and/or a server-computing device.

When the file type is supported, the method continues at block 408 where the attachment is opened. At least one page of the attachment is converted to an image file at block 410. As described earlier, any suitable technique can be used to convert the page(s) of the attachment to an image file. For example, the at least one page can be converted to an image file by saving the one or more pages as an image file, by printing the page(s) to an image file, or by capturing an image of the page(s) using an image sensor or other suitable imaging device or process (e.g., a screenshot).

A determination is then made at block 412 as to whether a HR attachment thumbnail of the attachment is to be generated. In one embodiment, the size or resolution of the image file produced at block 410 is used to determine whether a HR attachment thumbnail is to be generated. The resolution of the image file can be determined by the number of pixels in the image file. For example, an image that is 2048 pixels in width and 1536 pixels in height has a total number of pixels of 2048×1536=3,145,728 pixels, typically referred to as a 3.1 megapixel image.

If the resolution of the image file is equal to or less than a threshold value, the process passes to block 414 where an indication is provided that indicates an HR attachment thumbnail will not be generated. The indication may be a signal or data that is provided to the email application, to an operating system, or to any suitable device or program running on a client-computing device and/or a server-computing device. In this instance, the representational element (e.g., icon or LR attachment thumbnail) is displayed to the user when the user views the email with the attachment.

When the resolution of the image is equal to or greater than the threshold value, the method continues at block 416 where a size of the HR attachment thumbnail is determined and the HR attachment thumbnail is generated in the determined size. In some embodiments, HR attachment thumbnails can be generated in multiple sizes. For example, an MBA application (e.g., MBA application 134 in FIG. 1) may be configured to generate a smaller-sized HR attachment thumbnail and a larger-sized HR attachment thumbnail. The dimensions of the smaller-sized HR attachment thumbnail may be 240 pixels by 360 pixels and the dimensions of the larger-sized HR attachment thumbnail can be 1280 pixels by 980 pixels, although embodiments are not limited to these dimensions. In other embodiments, the smaller and larger sized HR attachment thumbnails may have different dimensions. Alternatively, in some embodiments, an MBA application may be configured to generate a smaller HR attachment thumbnail, a medium-sized HR attachment thumbnail, and a larger-sized HR attachment thumbnail.

The HR attachment thumbnail is generated at block 416 using any suitable process. For example, the image file produced at block 410 may be the HR attachment thumbnail, or the size of the HR attachment thumbnail can be based on the size of the image file. The image file can be resized or cropped to produce the HR attachment thumbnail. In another embodiment, the size of the HR attachment thumbnail may be based on the file type of the attachment. Additionally or alternatively, the size of the HR attachment thumbnail may be based on a user preference.

After the HR attachment thumbnail is generated at block 416, a determination is made at block 418 as to whether the email with the LR attachment thumbnail has been opened or viewed. In some embodiments, an indication (e.g., signal or data) is received that indicates whether the email with the LR attachment thumbnail has been viewed or opened. The indication may be sent by an email application, an operating system, or any suitable device or program running on a client-computing device and/or a server-computing device.

If the email has been opened or viewed, the method passes to block 420 where an indication (e.g., data or signal) is provided that indicates the LR attachment thumbnail will not be replaced with a HR attachment thumbnail. In this situation, the LR attachment thumbnail is displayed when the user views the email. The HR attachment thumbnail may then be discarded or saved (block 422).

If the email has not been viewed or opened, the process continues at block 424 where the HR attachment thumbnail and an indication (e.g., data, signal) is provided that indicates the LR attachment thumbnail is to be replaced with the HR attachment thumbnail. The indication can be provided to the email application, to an operating system, or to any suitable device or program running on a client-computing device and/or a server-computing device. In some embodiments, the provision of the HR attachment thumbnail functions as the indication that the LR attachment is to be replaced with the HR attachment thumbnail. In this instance, the HR attachment thumbnail is presented to the user when the user views the email. The LR attachment thumbnail may be saved or discarded when the LR attachment thumbnail is replaced with the HR attachment thumbnail.

Other embodiments can add blocks, omit blocks, modify blocks, or rearrange the blocks shown in FIG. 3. For example, in some embodiments, block 416 may be modified such that the size of the image file is not determined and a HR attachment thumbnail is generated in one predefined size. Additionally or alternatively, blocks 418, 420, 422 can be omitted and the LR attachment thumbnail is replaced with the HR attachment thumbnail regardless of whether the email has been viewed or not.

In one aspect, various blocks can be distributed and performed by multiple MBA applications or by a program (e.g., an email application) and an MBA application. For example, blocks 402, 404, 406 may be performed by one MBA application and the remaining blocks can be performed by another MBA application. Alternatively, blocks 402, 404, 406 may be performed by a program and the remaining blocks can be performed by an MBA application.

Figure 5A:
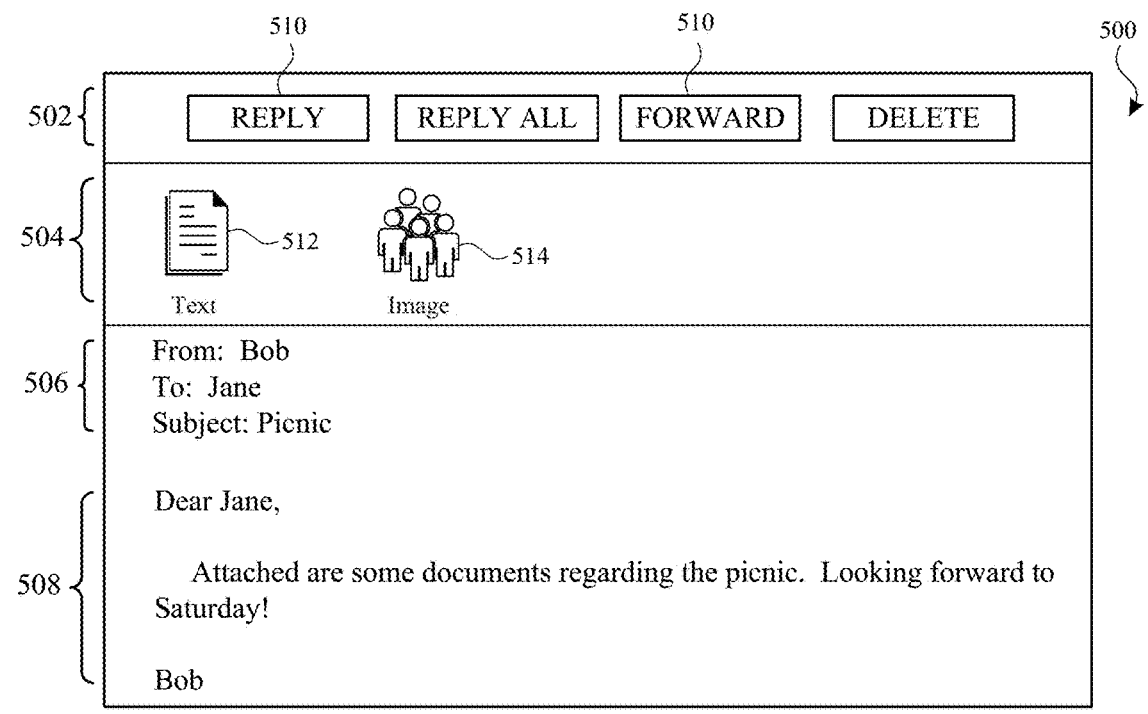
FIGS. 5A-5B illustrate example electronic mails that each include high resolution or low resolution attachment thumbnails.
Figure 5B:
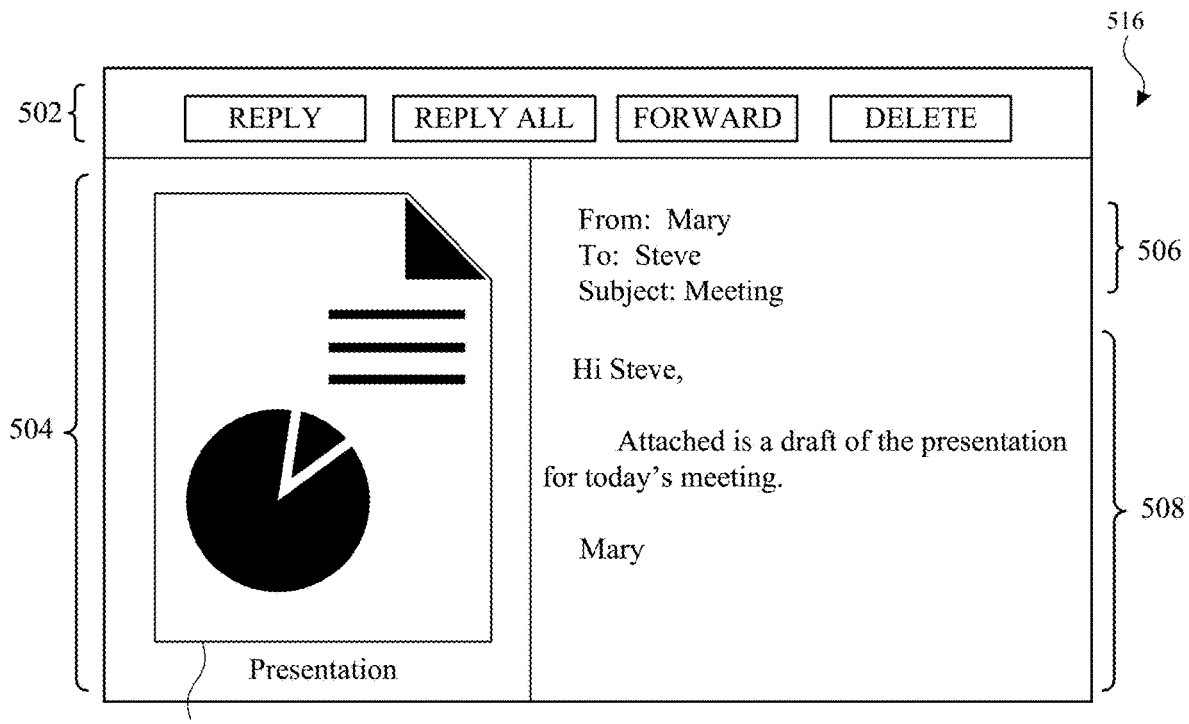

FIGS. 5A-5B depict example electronic mails that include one or more high resolution or low resolution attachment thumbnails. As shown in FIG. 5A, an email 500 that is received by a recipient includes an operations section 502, an attachment section 504, a header section 506, and a message section 508. The operations section 502 includes one or more control operations or buttons 510 that may be performed on or with the email 500. For example, in the illustrated embodiment, the recipient may delete the email 500, reply to the email 500 (reply or reply all), or forward the email 500 to a subsequent recipient.

The header section 506 includes information regarding the sender (Bob), the recipient (Jane), and the subject of the email 500 (Picnic). The message section 508 includes the message (text, data, etc.) associated with the email 500 that the sender wants to send to the recipient.

The attachment section 504 displays the attachment thumbnails for one or more attachments that are attached to the email 500. As shown, two attachment thumbnails 512, 514 represent the attachments. Each attachment thumbnail 512, 514 may be a LR attachment thumbnail or a HR attachment thumbnail. Additionally, the attachments represented by the attachment thumbnails 512, 514 can be associated with any file type (e.g., word processing document, PDF document, spreadsheet document, image document). In the illustrated embodiment, the attachment represented by the attachment thumbnail 512 is associated with a word processing file and the attachment represented by the attachment thumbnail 514 is associated with an image file.

FIG. 5B illustrates another example electronic mail that includes one or more high resolution or low resolution attachment thumbnails. Like the email 500 shown in FIG. 5A, the email 516 includes an operations section 502, an attachment section 504, a header section 506, and a message section 508. However, in this embodiment the attachment section 504 is larger and is positioned laterally adjacent to the header and message sections 506, 508. This arrangement allows the attachment thumbnail 518 to be larger and consume more space in the email 516. The enlarged size of the attachment thumbnail 518 can make it easier for a user (e.g., a recipient) to view the attachment thumbnail 518. When the attachment thumbnail 518 is a HR attachment thumbnail, the user is able to see more details in the image of the attachment thumbnail (e.g., the first page). The HR attachment thumbnail may provide a preview of the page(s) that form the HR attachment thumbnail.

An email can include fewer, more, or different sections in other embodiments. Additionally, the sections may be positioned in any suitable arrangement. For example, the attachment section 504 can be situated below the message section in some embodiments. Additionally or alternatively, the operations section 502 may be omitted and the operations or buttons included in a toolbar of the email application.

Although FIGS. 1-5B are described in conjunction with an email application and an email with one or more attachments, other embodiments are not limited to this type of electronic communications. Embodiments of the invention can be implemented with any suitable electronic communications program that is operable to attach attachments to the electronic communications (e.g., electronic messages). For example, a texting application or an instant messaging application can practice aspects of the disclosure.

Figure 6:
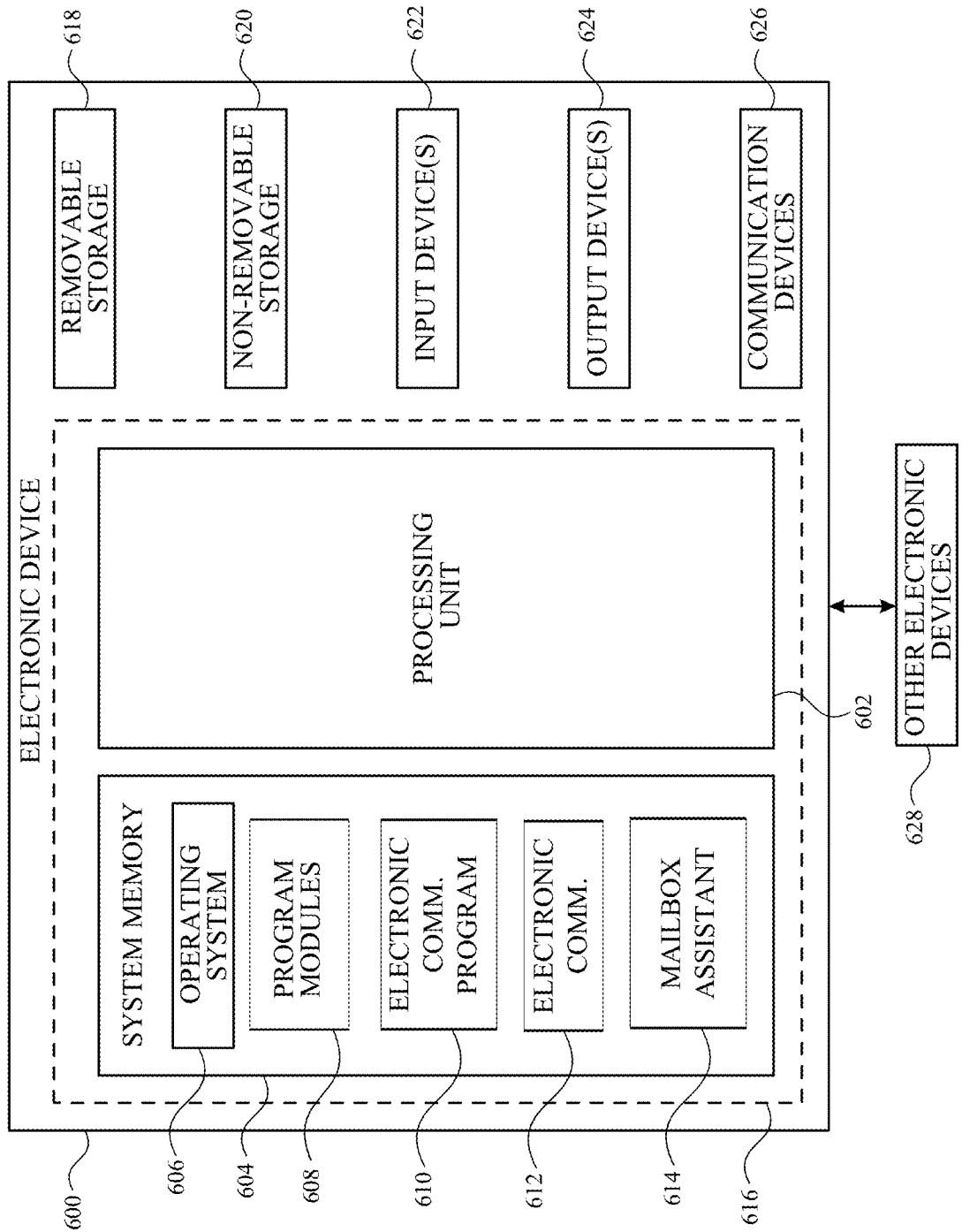
FIG. 6 is a block diagram depicting example physical components of a computing device with which aspects of the disclosure may be practiced.
Figure 7A:
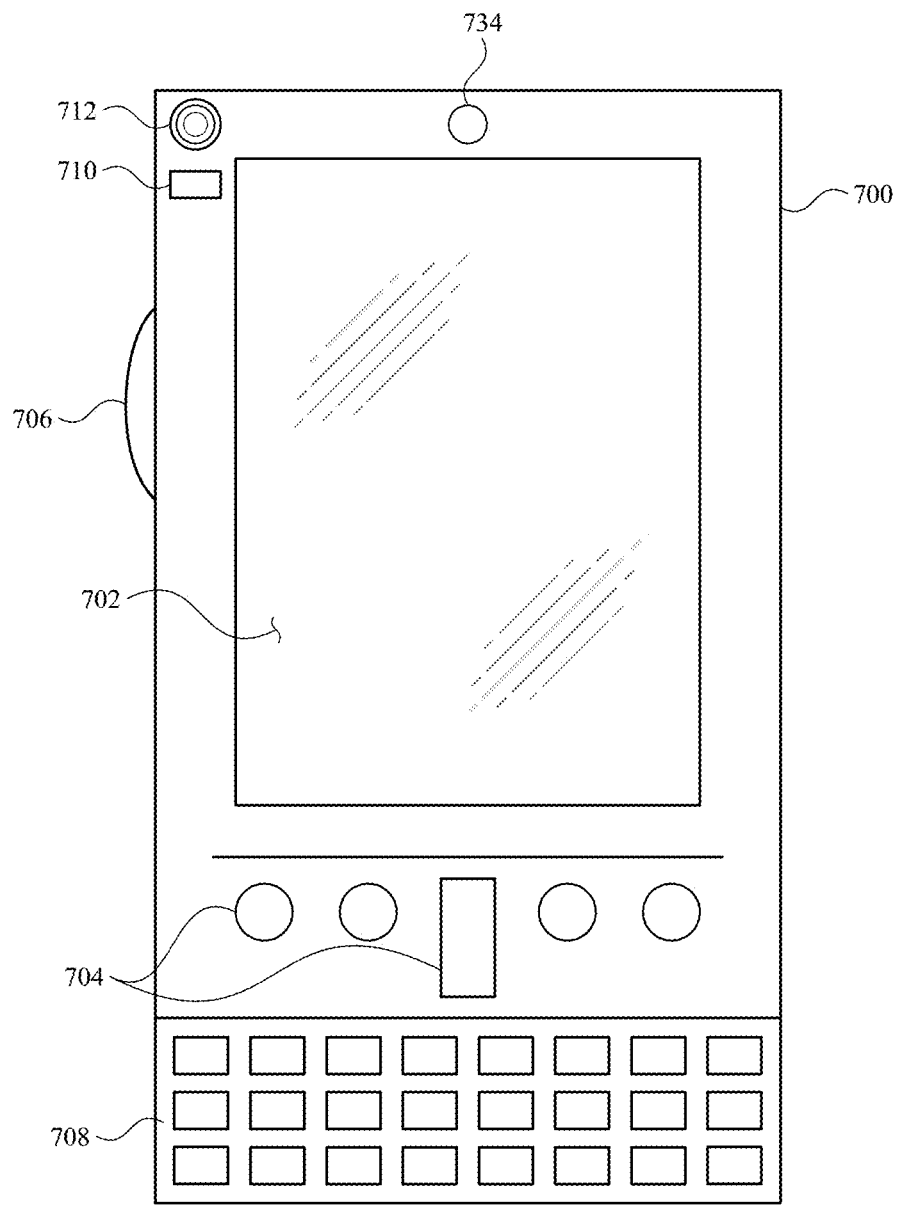
FIGS. 7A-7B are simplified block diagrams illustrating a mobile computing device with which aspects of the present disclosure may be practiced.
Figure 7B:
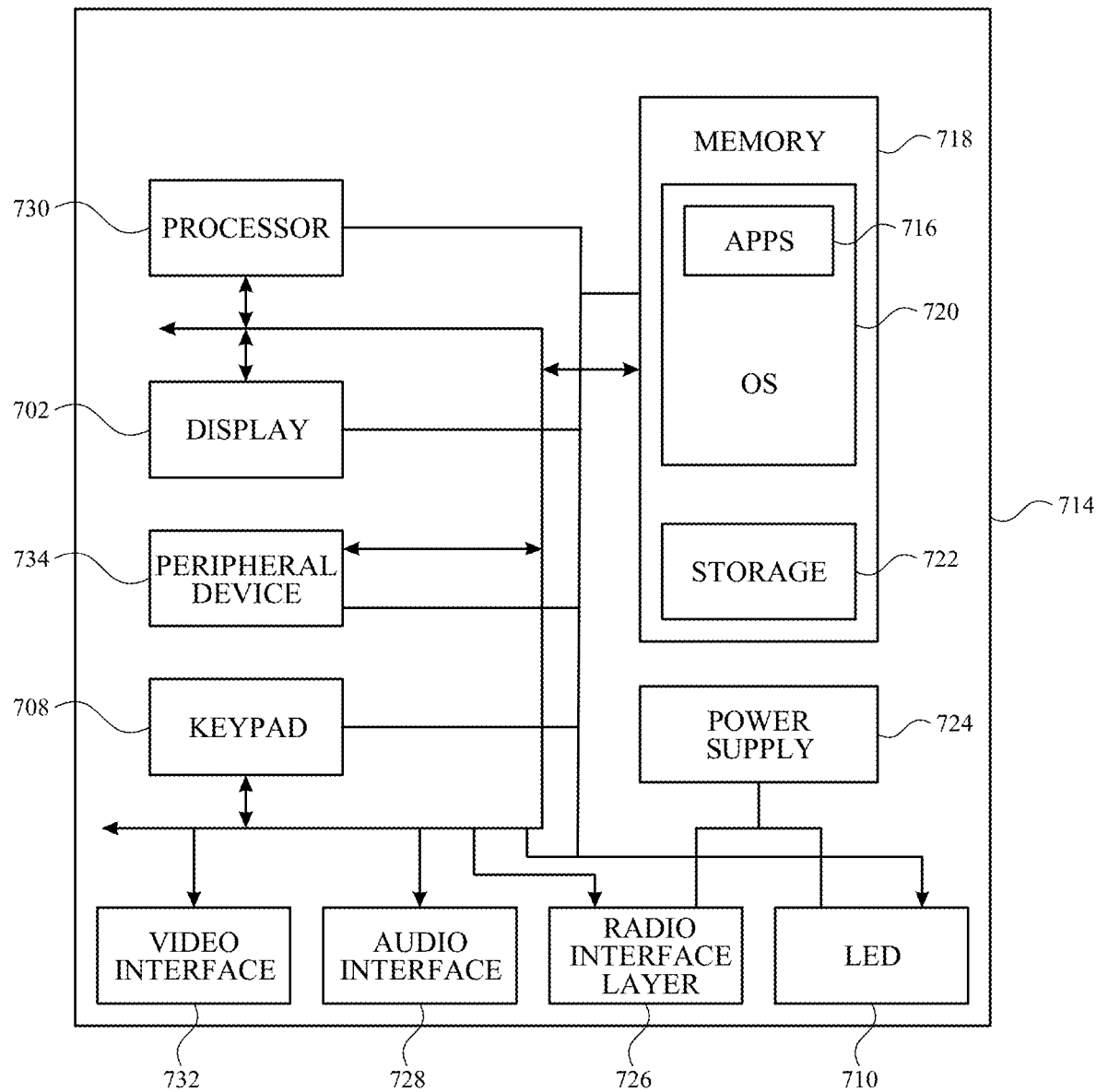
Figure 8:
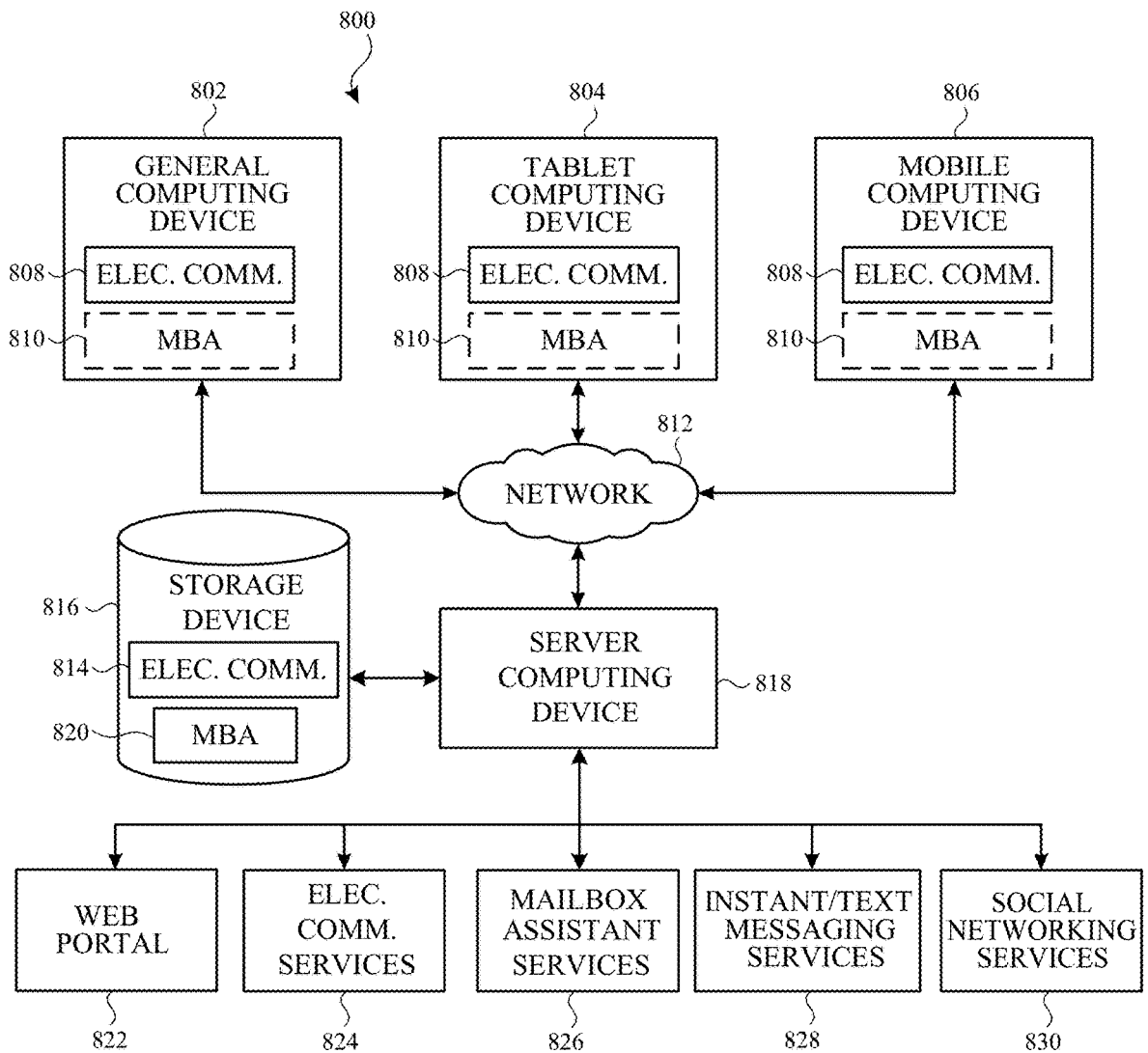
FIG. 8 is a block diagram depicting a distributed computing system in which aspects of the present disclosure may be practiced.

FIGS. 6-8 and the associated descriptions provide a discussion of a variety of operating environments in which aspects of the disclosure may be practiced. However, the devices and systems illustrated and discussed with respect to FIGS. 6-8 are for purposes of example and illustration and are not limiting of a vast number of electronic device configurations that may be utilized for practicing aspects of the disclosure, as described herein.

FIG. 6 is a block diagram illustrating physical components (e.g., hardware) of an electronic device 600 with which aspects of the disclosure may be practiced. The components described below may be suitable for the computing devices described above, including the client-computing devices 106, 108 and/or the server-computing devices 110, 118 in FIG. 1.

In a basic configuration, the electronic device 600 may include at least one processing unit 602 and a system memory 604. Depending on the configuration and type of the electronic device, the system memory 604 may comprise, but is not limited to, volatile storage (e.g., random access memory), non-volatile storage (e.g., read-only memory), flash memory, or any combination of such memories. The system memory 604 may include a number of program modules and data files, such as an operating system 606, one or more program modules 608 suitable for parsing received input, determining subject matter of received input, determining actions associated with the input and so on, an electronic communication program 610, electronic communications 612, and/or a mailbox assistant (MBA) application 614. While executing on the processing unit 602, the instructions in the electronic communication program 610 and/or the mailbox assistant application 614 may perform and/or cause to be performed processes including, but not limited to, the aspects as described herein.

The operating system 606, for example, may be suitable for controlling the operation of the electronic device 600. Furthermore, embodiments of the disclosure may be practiced in conjunction with a graphics library, other operating systems, or any other application program and is not limited to any particular application or system. This basic configuration is illustrated in FIG. 6 by those components within a dashed line 616.

The electronic device 600 may have additional features or functionality. For example, the electronic device 600 may also include additional data storage devices (removable and/or non-removable) such as, for example, magnetic disks, optical disks, or tape. Such additional storage is illustrated in FIG. 6 by a removable storage device 618 and a non-removable storage device 620.

The electronic device 600 may also have one or more input device(s) 622 such as a keyboard, a trackpad, a mouse, a pen, a sound or voice input device, a touch, force and/or swipe input device, etc. The output device(s) 624 such as a display, speakers, a printer, etc. may also be included. The aforementioned devices are examples and others may be used. The electronic device 600 may include one or more communication devices 626 allowing communications with other electronic devices 628. Examples of suitable communication devices 626 include, but are not limited to, radio frequency (RF) transmitter, receiver, and/or transceiver circuitry; universal serial bus (USB), parallel, and/or serial ports.

The term computer-readable media as used herein may include computer storage media. Computer storage media may include volatile and nonvolatile, removable and non-removable media implemented in any method or technology for storage of information, such as computer readable instructions, data structures, or program modules.

The system memory 604, the removable storage device 618, and the non-removable storage device 620 are all computer storage media examples (e.g., memory storage or storage device). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electronic device 600. Any such computer storage media may be part of the electronic device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit.

When operating via an SOC, the functionality described herein may be operated via application-specific logic integrated with other components of the electronic device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

FIGS. 7A and 7B illustrate a mobile electronic device 700, for example, a mobile telephone, a smart phone, wearable computer (such as a smart watch), a tablet computer, a laptop computer, and the like, with which embodiments of the disclosure may be practiced. With reference to FIG. 7A, one aspect of a mobile electronic device 700 for implementing the aspects is illustrated.

In a basic configuration, the mobile electronic device 700 is a handheld computer having both input elements and output elements. The mobile electronic device 700 typically includes a display 702 and one or more input buttons 704 that allow the user to enter information into the mobile electronic device 700. The display 702 of the mobile electronic device 700 may also function as an input device (e.g., a display that accepts touch and/or force input).

If included, an optional side input element 706 allows further user input. The side input element 706 may be a rotary switch, a button, or any other type of manual input element. In alternative aspects, mobile electronic device 700 may incorporate more or less input elements. For example, the display 702 may not be a touch screen in some embodiments. In yet another alternative embodiment, the mobile electronic device 700 is a portable phone system, such as a cellular phone. The mobile electronic device 700 may also include an optional keypad 708. Optional keypad 708 may be a physical keypad or a "soft" keypad generated on the touch screen display.

In various embodiments, the output elements include the display 702 for showing a graphical user interface (GUI) and a set of available templates, a visual indicator 710 (e.g., a light emitting diode), and/or an audio transducer 712 (e.g., a speaker). In some aspects, the mobile electronic device 700 incorporates a vibration transducer for providing the user with tactile feedback. In yet another aspect, the mobile electronic device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of a mobile electronic device 700. That is, the mobile electronic device 700 can incorporate a system (e.g., an architecture) 714 to implement some aspects. In one embodiment, the system 714 is implemented as a "smart phone" capable of running one or more applications (e.g., browser, e-mail, calendaring, contact managers, messaging clients, games, media clients/players, content selection and sharing applications and so on). In some aspects, the system 714 is integrated as an electronic device, such as an integrated personal digital assistant (PDA) and wireless phone.

One or more application programs 716 may be loaded into the memory 718 and run on or in association with the operating system 720. Examples of the application programs include phone dialer programs, e-mail programs, personal information management (PIM) programs, word processing programs, spreadsheet programs, Internet browser programs, messaging programs, and so forth.

The system 714 also includes a non-volatile storage area 722 within the memory 718. The non-volatile storage area 722 may be used to store persistent information that should not be lost if the system 714 is powered down.

The application programs 716 may use and store information in the non-volatile storage area 722, such as email, attachments or other messages used by an email application, and the like. A synchronization application (not shown) also resides on the system 714 and is programmed to interact with a corresponding synchronization application resident on a host computer to keep the information stored in the non-volatile storage area 722 synchronized with corresponding information stored at the host computer.

The system 714 has a power supply 724, which may be implemented as one or more batteries. The power supply 724 may further include an external power source, such as an AC adapter or a powered docking cradle that supplements or recharges the batteries.

The system 714 may also include a radio interface layer 726 that performs the function of transmitting and receiving radio frequency communications. The radio interface layer 726 facilitates wireless connectivity between the system 714 and the "outside world," via a communications carrier or service provider. Transmissions to and from the radio interface layer 726 are conducted under control of the operating system 720. In other words, communications received by the radio interface layer 726 may be disseminated to the application programs 716 via the operating system 720, and vice versa.

The visual indicator 710 may be used to provide visual notifications, and/or an audio interface 728 may be used for producing audible notifications via an audio transducer (e.g., audio transducer 712 illustrated in FIG. 7A). In the illustrated embodiment, the visual indicator 710 is a light emitting diode (LED) and the audio transducer 712 may be a speaker. These devices may be directly coupled to the power supply 724 so that when activated, they remain on for a duration dictated by the notification mechanism even though the processor 730 and other components might shut down for conserving battery power. The LED may be programmed to remain on indefinitely until the user takes action to indicate the powered-on status of the device.

The audio interface 728 is used to provide audible signals to and receive audible signals from the user (e.g., voice input such as described above). For example, in addition to being coupled to the audio transducer 712, the audio interface 728 may also be coupled to a microphone to receive audible input, such as to facilitate a telephone conversation. In accordance with embodiments of the present disclosure, the microphone may also serve as an audio sensor to facilitate control of notifications, as will be described below.

The system 714 may further include a video interface 732 that enables an operation of peripheral device 734 (e.g., on-board camera) to record still images, video stream, and the like.

A mobile electronic device 700 implementing the system 714 may have additional features or functionality. For example, the mobile electronic device 700 may also include additional data storage devices (removable and/or non-removable) such as, magnetic disks, optical disks, or tape. Such additional storage is illustrated in FIG. 7B by the non-volatile storage area 722.

Data/information generated or captured by the mobile electronic device 700 and stored via the system 714 may be stored locally on the mobile electronic device 700, as described above, or the data may be stored on any number of storage media that may be accessed by the device via the radio interface layer 726 or via a wired connection between the mobile electronic device 700 and a separate electronic device associated with the mobile electronic device 700, for example, a server-computing device in a distributed computing network, such as the Internet (e.g., server-computing device 110 or 118 in FIG. 1). As should be appreciated such data/information may be accessed via the mobile electronic device 700 via the radio interface layer 726 or via a distributed computing network. Similarly, such data/information may be readily transferred between electronic devices for storage and use according to well-known data/information transfer and storage means, including electronic mail and collaborative data/information sharing systems.

As should be appreciated, FIG. 7A and FIG. 7B are described for purposes of illustrating the present methods and systems and is not intended to limit the disclosure to a particular sequence of steps or a particular combination of hardware or software components.

FIG. 8 is a block diagram illustrating a distributed system in which aspects of the disclosure may be practiced. The system 800 allows a user to send and receive electronic communications that include one or more attachments through a general computing device 802 (e.g., a desktop computer), a tablet computing device 804, and/or a mobile computing device 806. The general computing device 802, the tablet computing device 804, and the mobile computing device 806 can each include the components, or be connected to the components, that are shown associated with the electronic device 600 in FIG. 6. Additionally, the general computing device 802, the tablet computing device 804, and the mobile computing device 806 each include an electronic communications application 808 and optionally an MBA application 810.

The general computing device 802, the tablet computing device 804, and the mobile computing device 806 are each configured to access one or more networks (represented by network 812) to interact with the electronic communications application 814 stored in one or more storage devices (represented by storage device 816) and executed on one or more server-computing devices (represented by server-computing device 818). The electronic communication application 814 can access, call, or work with the MBA application 820 stored on the storage deice 816 and executed on the server-computing device 818 when the electronic communication application 814 is used to generate and/or send an electronic communication that includes one or more attachments.

In some aspects, the server-computing device 818 can access and/or receive various types of services, communications, documents and information transmitted from other sources, such as a web portal 822, an electronic communications services 824, mailbox services 826, instant messaging and/or text services 828, and/or social networking services 824. In some instances, these sources may provide robust reporting, analytics, data compilation and/or storage service, etc., whereas other services may provide search engines or other access to data and information, images, videos, document processing and the like.

In some embodiments, when the general computing device 802, the tablet computing device 804, and/or the mobile computing device 806 include the MBA application 810, the electronic communications program 808 can call, access, or work with at least one MBA application 810. Thus, the operations of generating an electronic communication (e.g., email), attaching one or more attachments to the electronic communication, providing a representational element for each attachment, providing an HR attachment thumbnail for each attachment, and replacing at least one representational element with a corresponding HR attachment thumbnail may be performed by general computing device 802, the tablet computing device 804, and the mobile computing device 806. For example, a user (sender) can use the electronic communications application 808 on one computing device to send an attachment and an email with a representational element representing the attachment and the MBA application 810 on the same or another computing device can provide an HR attachment thumbnail for the attachment and replace the representational element with the HR attachment thumbnail.

As should be appreciated, FIG. 8 is described for purposes of illustrating the present methods and systems and is not intended to limit the disclosure to a particular sequence of steps or a particular combination of hardware or software components.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A system, comprising:
   one or more processing units; and
   one or more storage devices storing instructions that when executed by the one or more processing units, cause the one or more processing units to perform a method comprising:
   attaching an attachment to an electronic communication;
   converting a page of the attachment to a first image;
   generating a low resolution (LR) attachment thumbnail from the first image;
   sending the electronic communication with the attachment and the LR attachment thumbnail to a recipient computing device;
   as the electronic communication is sending or after the electronic communication is sent to the recipient computing device:
   converting the page of the attachment to a second image; and
   generating a high resolution (HR) attachment thumbnail from the second image;
   determining that the electronic communication has not been opened at the recipient computing device; and
   in response to the determination, providing the HR attachment thumbnail to the recipient computing device, wherein the LR attachment thumbnail is replaced with the HR attachment thumbnail at the recipient computing device.

2. The system of claim 1, wherein generating the LR attachment thumbnail from the first image comprises:
   obtaining image metadata associated with the first image, the image metadata including an embedded image thumbnail; and
   generating the LR attachment thumbnail from the image metadata, wherein the LR attachment thumbnail comprises the embedded image thumbnail.

3. The system of claim 1, wherein the recipient computing device comprises one of a server-computing device or a client-computing device.

4. The system of claim 1, wherein the method caused to be performed by the one or more processing units further comprises:
   prior to generating the HR attachment thumbnail from the second image, determining a resolution of the second image;
   determining the resolution of the second image is equal to or exceeds a threshold resolution; and
   generating the HR attachment thumbnail from the second image in response to the determination that the resolution of the second image is equal to or exceeds the threshold resolution.

5. A method, comprising:
   attaching an attachment to an electronic communication;
   converting a page of the attachment to a first image;
   generating a low resolution (LR) attachment thumbnail from the first image;
   sending the electronic communication with the attachment and the LR attachment thumbnail to a recipient computing device;
   as the electronic communication is sending or after the electronic communication is sent to the recipient computing device:
   converting the page of the attachment to a second image;
   generating a high resolution (HR) attachment thumbnail from the second image;
   determining that the electronic communication has not been opened at the recipient computing device; and
   in response to the determination, providing the HR attachment thumbnail to the recipient computing device, wherein the LR attachment thumbnail is replaced with the HR attachment thumbnail at the recipient computing device.

6. The method of claim 5, wherein the LR attachment thumbnail comprises an embedded image thumbnail that is associated with image metadata.

7. The method of claim 5, wherein the electronic communication comprises an electronic mail message.

8. The method of claim 5, wherein the replacement of the LR attachment thumbnail with the HR attachment thumbnail at the recipient computing device causes the HR attachment thumbnail to be displayed in the electronic communication when the electronic communication is opened at the recipient computing device.

9. The method of claim 5, wherein the LR attachment thumbnail is discarded when the LR attachment thumbnail is replaced by the HR attachment thumbnail.

10. The method of claim 5, further comprising:
    prior to generating the HR attachment thumbnail from the second image, determining a resolution of the second image;
    determining the resolution of the second image is equal to or exceeds a threshold resolution; and
    generating the HR attachment thumbnail from the second image in response to the determination that the resolution of the second image is equal to or exceeds the threshold resolution.

11. The method of claim 5, further comprising:
attaching another attachment to another electronic communication;
converting a page of the other attachment to a third image;
generating another LR attachment thumbnail from the third image;
sending another electronic communication with the other attachment and the other LR attachment thumbnail to the recipient computing device;
after sending the other electronic communication to the recipient computing device, determining a file type associated with the attachment is not supported; and
in response to the determination that the file type associated with the other attachment is not supported, providing an indication to the recipient computing device that indicates a HR attachment thumbnail will not be generated.

12. The method of claim 5, further comprising:
attaching another attachment to another electronic communication;
converting a page of the other attachment to a third image;
generating another LR attachment thumbnail from the third image;
sending another electronic communication with the other attachment and the other LR attachment thumbnail to the recipient computing device;
after sending the other electronic communication to the recipient computing device, converting the page of the other attachment to a fourth image;
determining a resolution of the fourth image;
determining the resolution of the fourth image is less than a threshold resolution; and
in response to the determination that the resolution of the fourth image is less than the threshold resolution, providing an indication to the recipient computing device that indicates a HR attachment thumbnail will not be generated.

13. The method of claim 5, further comprising
attaching another attachment to another electronic communication;
converting a page of the other attachment to a third image;
generating another LR attachment thumbnail from the third image;
sending another electronic communication with the other attachment and the other LR attachment thumbnail to the recipient computing device;
after sending the other electronic communication to the recipient computing device, converting the page of the other attachment to a fourth image;
generating another HR attachment thumbnail from the fourth image;
determining whether the other electronic communication has been opened at the recipient computing device; and
in response to a determination that the other electronic communication has been opened at the recipient computing device, provide an indication to the recipient computing device that indicates the other LR attachment thumbnail will not be replaced with the other HR attachment thumbnail.

14. A method for generating attachment thumbnails, the method comprising:
attaching, by a first computing device, an attachment to an electronic communication;
converting, by the first computing device, a page of the attachment to a first image;
generating, by the first computing device, a low resolution (LR) attachment thumbnail from the first image;
sending, by the first computing device, the electronic communication with the attachment and the LR attachment thumbnail;
receiving, by a second computing device, the electronic communication with the attachment and the LR attachment thumbnail;
converting, by the second computing device, the page of the attachment to a second image;
generating, by the second computing device, a high resolution (HR) attachment thumbnail from the second image;
determining, by the second computing device, that the electronic communication has not been opened at the second computing device; and
in response to the determination, replacing the LR attachment thumbnail with the HR attachment thumbnail.

15. The method of claim 14, wherein generating the HR attachment thumbnail comprises generating the HR attachment thumbnail in a resolution that is based on the resolution of the second image.

16. The method of claim 14, further comprising:
prior to converting the page of the attachment to the second image, determining, by the second computing device, a file type associated with the attachment is supported; and
converting the page of the attachment to the second image in response to the determination that the file type associated with the attachment is supported.

17. The method of claim 14, further comprising:
upon converting the page of the attachment to the second image, determining, by the second computing device, a resolution of the second image;
determining, by the second computing device, the resolution of the second image equals or exceeds a threshold resolution; and
generating the HR attachment thumbnail from the second image in response to the determination that the resolution of the second image equals or exceeds the threshold resolution.

18. The method of claim 14, further comprising discarding, by the second computing device, the LR attachment thumbnail following the replacement of the LR attachment thumbnail with the HR attachment thumbnail.

19. The method of claim 14, wherein generating the HR attachment thumbnail from the second image comprises generating the HR attachment thumbnail in one of multiple sizes using the second image.

20. The method of claim 14, wherein the second computing device comprises one of a server-computing device or a client-computing device.

* * * * *